United States Patent [19]

Nicholls

[11] 3,963,225
[45] June 15, 1976

[54] TELESCOPIC GAS SPRINGS
[75] Inventor: Lawrence George Nicholls, Birmingham, England
[73] Assignee: Girling Limited, Birmingham, England
[22] Filed: Apr. 29, 1974
[21] Appl. No.: 465,240

Related U.S. Application Data
[62] Division of Ser. No. 259,578, June 5, 1972.

[52] U.S. Cl. ................................ 267/65 R; 267/34
[51] Int. Cl.² ........................................... F16F 5/00
[58] Field of Search ................ 267/65 R, 64 R, 8 A, 267/34

[56] References Cited
UNITED STATES PATENTS
2,833,379   5/1958   Mathews et al. ................... 267/65 R
3,171,643   3/1965   Roos .................................. 267/65 R
3,595,349   7/1971   Ortheil .............................. 267/8 A Primary Examiner—James B. Marbert
Attorney, Agent, or Firm—Scrivener Parker Scrivener and Clarke

[57] ABSTRACT

A telescopic gas spring comprises a cylinder closed at one end, a piston slidable in the cylinder and a piston rod carrying the piston and extending sealingly through the other end of the cylinder. An auxiliary spring is disposed at the closed end of the cylinder and comes into operation as the piston approaches a position of full compression, to provide additional resistance to further compression of the gas spring. The auxiliary spring may be a coil spring or a gas spring.

5 Claims, 4 Drawing Figures

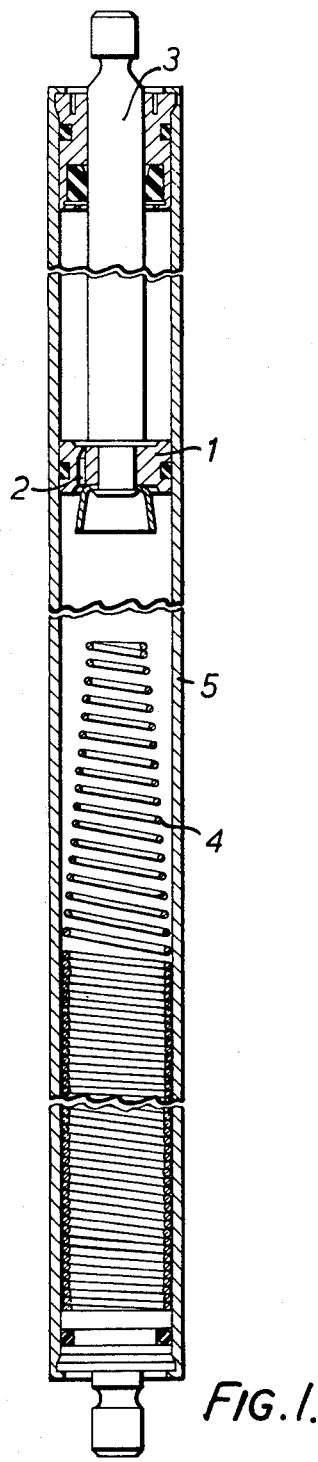
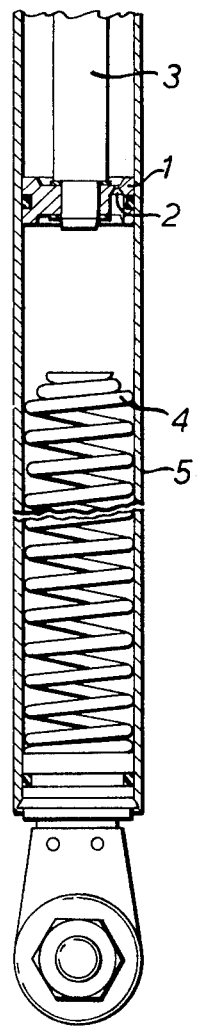
FIG. 1.
FIG. 2.

TELESCOPIC GAS SPRINGS

This is a division of application Ser. No. 259,578, filed June 5, 1972.

This invention relates to telescopic gas springs.

Telescopic gas springs are commonly used to assist in the opening of automobile bonnets and upwardly opening doors. Due to the geometry of the doors they are fitted to, it is difficult to obtain the desired rate of opening from the closed to the open position. More particularly, a higher thrust is required to raise the door through the first stage of opening than to continue opening the door. Furthermore, to avoid damaging the door when it is being closed, it is desirable to have some means to restrict the travel of the door as it approaches its closed position.

According to the invention, there is provided a telescopic gas spring comprising a cylinder closed at one end, a piston slidable in the cylinder, a piston rod carrying the piston and extending sealingly through the other end of the cylinder, and auxiliary biasing means which comes into operation as the piston approaches a position of full compression, to provide additional resistance to further compression of the gas spring.

Some forms of telescopic gas springs in accordance with the invention will now be described, by way of example, with reference to the accompanying drawings, in which:

FIG. 1 is a cross-sectional view of one form of gas spring;

FIG. 2 shows a modified form of the gas spring of FIG. 1;

Figure 3:
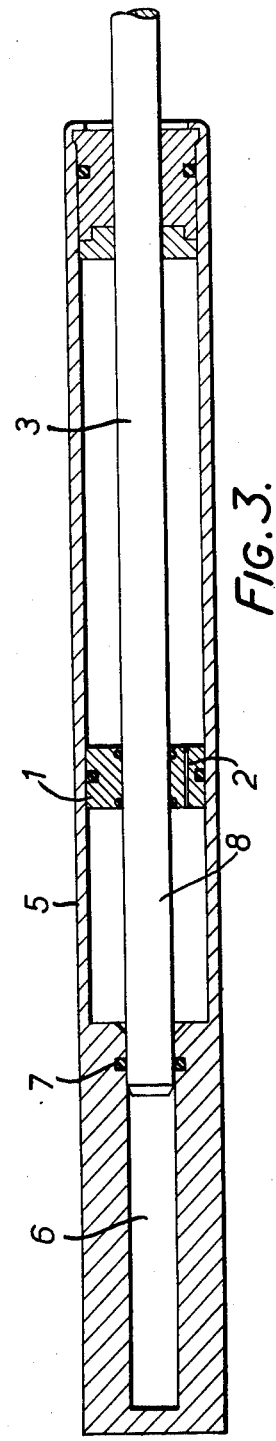
FIG. 3 is a cross-sectional view of another form of gas spring.

Referring to FIG. 1 of the drawings, a gas spring comprises a piston 1 secured to a piston rod 3. The piston 1 is provided with a damping orifice 2 and can be moved reciprocally in its cylinder 5. A conical spring 4 is positioned in the end of the cylinder 5 and can be compressed within itself so that no coils rub on the internal surface of the cylinder 5.

On compression, the piston 1 engages the conical spring 4 as it nears full compression. This further increases the resistance of the gas spring to compression and provides a "check" on the final compression of the spring. Conversely, when the compressive force is released, the spring 4 provides an initially higher thrust on the piston rod 3 than would be achieved in its absence.

The construction and operation of the gas spring shown in FIG. 2 is generally similar to that of the spring of FIG. 1 except that the spring 4 is not conical but of constant diameter.

Figure 4:
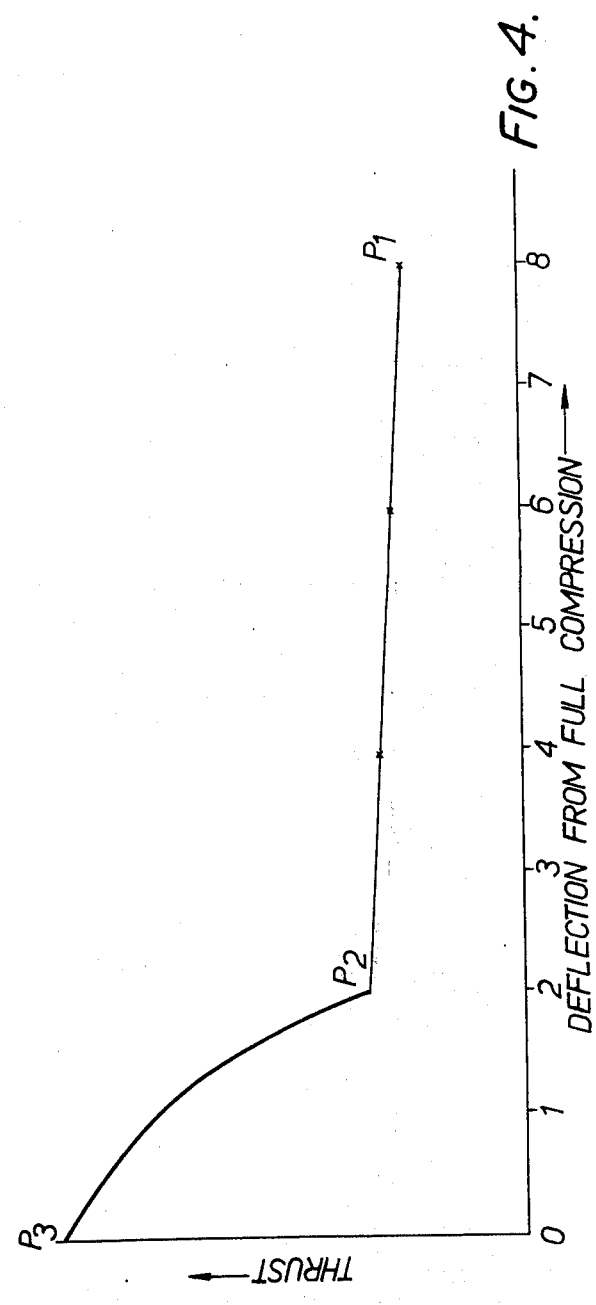
FIG. 4 is a graph illustrating operating characteristics of the gas spring shown in FIG. 3.

In the embodiment shown in FIG. 3, the piston rod 3 has a portion 8 which extends beyond the piston 1 into the cylinder 5. The end of the cylinder 5 is provided with a bore 6 of reduced diameter in which is mounted a seal 7. The operation of the unit is now described with reference to FIG. 4.

On compression, the thrust exerted on the piston rod 3 increases substantially linearly as the pressure varies from $P_1$ (the charge pressure) to $P_2$. At the position corresponding to $P_2$ the piston rod portion 8 enters the bore to effectively form an auxiliary gas spring, and the rate of increase of thrust with rod movement increases because of the extra resistance of the auxiliary gas sring.

Other forms of auxiliary biasing means than those described and illustrated above could, of course be used, such as rubber springs.

I claim:

1. A gas spring comprising a cylinder containing gas under pressure and having a closed end and an open end, a piston rod and piston assembly operating in said cylinder, said rod extending slideably and sealingly through the open end of the cylinder and being moveable between a normally fully retracted position within the cylinder and a normally fully extended position, the pressure of the gas in said cylinder acting on the cross sectional area of said rod to urge it at all times towards its normally extended position, said piston being connected to said rod and slidably engaging the wall of said cylinder, damping orifice means extending through said piston, a reduced diameter bore at the closed end of said cylinder and having one end opening into said cylinder and its opposite end closed and immovable relative to said cylinder an extension carried by said piston rod and piston assembly and extending towards and in axial alignment with the open end of said reduced diameter bore, the relative length of said extension and said bore being such that said extension is clear of said reduced diameter bore when said piston rod is in its extended position, with said extension slidably and sealingly entering said bore during the terminal movement of said rod towards its retracted position to check the same by the increased fluid pressure trapped in said bore by said extension, said increased pressure in said bore thereafter providing an initially higher thrust on said rod during its initial movement from its retracted to its extended position than would be provided by the pressure of the gas alone in the cylinder the quantity of gas under pressure in said cylinder and said bore remaining at all times substantially constant.

2. The gas spring of claim 1 wherein said extension is an integral continuation of said piston rod.

3. The gas spring of claim 1 wherein said extension comprises an end portion of said piston rod which extends beyond said piston in the direction of the open end of said bore.

4. The gas spring of claim 1 including sealing means co-operating with said extension and said bore to prevent the escape of gas from said bore when the extension is received therein.

5. A gas spring comprising a cylinder containing gas under pressure and having a first and a second end, a piston rod and piston assembly operating in said cylinder, said rod extending slidably and sealingly through the first end of the cylinder and being movable between a retracted position within the cylinder and an extended position, the pressure of the gas in said cylinder acting on the cross sectional area of said rod to urge it at all times towards its extended position, said piston being connected to said rod and slidably engaging the wall of said cylinder, damping orifice means extending through said piston, means at the outer end of said rod and the second end of said cylinder for connecting said gas spring between a support and a movable device for movement of said device from a first position to a second position when said rod is moved to its extended position by the pressure of gas in said cylinder, a bore of reduced diameter disposed at the second end of said cylinder and having an open end extending in the direction of the first end of said cylinder and having its opposite end closed and immovable relative to said cylinder, an extension carried by said piston rod and piston assembly and extending towards and in axial alignment with the open end of said reduced diameter bore, the relative length of said extension and said bore being such that said extension is clear of said reduced diameter bore when said piston rod is in its extended position, with said extension slidably and sealingly entering said bore during the terminal movement of said rod towards it retracted position to check the same by the increased fluid pressure trapped in said bore by said extension, said increased pressure in said bore thereafter providing an initially higher thrust on said rod during its initial movement from its retracted to its extended position than would be provided by the pressure of the gas alone in the cylinder, the quantity of gas under pressure in said cylinder and said bore remaining at all times substantially constant.

* * * * *

UNITED STATES PATENT OFFICE
CERTIFICATE OF CORRECTION

Patent No. 3,963,225  Dated June 15, 1976

Inventor(s) Lawrence George Nicholls

It is certified that error appears in the above-identified patent and that said Letters Patent are hereby corrected as shown below:

[30]  Foreign Application Priority Data

June 9, 1971   Great Britain.....19658/71

Signed and Sealed this

[SEAL]

Twenty-first Day of September 1976

Attest:

RUTH C. MASON
*Attesting Officer*

C. MARSHALL DANN
*Commissioner of Patents and Trademarks*